US010458386B2

(12) United States Patent
Watanabe et al.

(10) Patent No.: US 10,458,386 B2
(45) Date of Patent: Oct. 29, 2019

(54) MODULAR HYDROKINETIC TURBINE

(71) Applicant: Power Development International, Inc., Wayland, MA (US)

(72) Inventors: Kahoru Watanabe, Sarasota, FL (US); Thomas M. Feldman, Wayland, MA (US)

(73) Assignee: Power Development International, Inc., Wayland, MA (US)

( * ) Notice: Subject to any disclaimer, the term of this patent is extended or adjusted under 35 U.S.C. 154(b) by 520 days.

(21) Appl. No.: 15/176,241

(22) Filed: Jun. 8, 2016

(65) Prior Publication Data
US 2016/0356262 A1    Dec. 8, 2016

Related U.S. Application Data

(60) Provisional application No. 62/172,563, filed on Jun. 8, 2015.

(51) Int. Cl.
*F03B 17/06* (2006.01)
*F03B 13/10* (2006.01)

(52) U.S. Cl.
CPC ........ *F03B 17/063* (2013.01); *F05B 2240/40* (2013.01); *F05B 2240/915* (2013.01); *F05B 2240/9151* (2013.01); *F05B 2240/93* (2013.01); *F05B 2240/932* (2013.01); *F05B 2250/80* (2013.01); *Y02E 10/28* (2013.01)

(58) Field of Classification Search
CPC ...... F03B 13/10; F03B 17/06; F05B 2240/40; F05B 2240/915; F05B 2240/9151; F05B 2240/93; F05B 2240/932; Y02E 10/28
See application file for complete search history.

(56) References Cited

U.S. PATENT DOCUMENTS

| | | | | |
|---|---|---|---|---|
| 3,986,787 A | * | 10/1976 | Mouton, Jr. | F03B 11/02 415/7 |
| 4,206,601 A | * | 6/1980 | Eberle | F03B 13/186 405/76 |
| 4,219,303 A | * | 8/1980 | Mouton, Jr. | F03B 17/061 415/123 |
| 4,383,182 A | * | 5/1983 | Bowley | F03B 13/183 290/43 |
| 6,091,161 A | * | 7/2000 | Dehlsen | B63G 8/18 290/43 |
| 8,766,466 B2 | * | 7/2014 | Dehlsen | F03B 17/061 290/43 |

(Continued)

FOREIGN PATENT DOCUMENTS

WO    2011144774 A1    11/2011

OTHER PUBLICATIONS

Notification of Transmittal of the International Search Report and the Written Opinion of the International Searching Authority for PCT/US2016/036318, "Modular Hydrokinetic Turbine", dated Aug. 29, 2016.

*Primary Examiner* — Igor Kershteyn
(74) *Attorney, Agent, or Firm* — Adler Pollock & Sheehan P.C.

(57) ABSTRACT

Methods and apparatus for a modular hydrokinetic turbine. An apparatus includes modular vertically floating units tethered to shore with a generator residing above a waterway and a plurality of vertically oriented blades submerged in the waterway to convert a latent kinetic energy of a moving waterway into electricity.

5 Claims, 9 Drawing Sheets

(56) References Cited

U.S. PATENT DOCUMENTS

| | | | |
|---|---|---|---|
| 9,494,130 B2 * | 11/2016 | Ko | F03B 13/264 |
| 9,745,951 B1 * | 8/2017 | Doyle | F03B 15/06 |
| 2007/0020097 A1 | 1/2007 | Ursua | |
| 2008/0018115 A1 * | 1/2008 | Orlov | F03B 17/061 290/54 |
| 2009/0230686 A1 | 9/2009 | Catlin | |
| 2010/0084862 A1 | 4/2010 | Unno | |
| 2011/0101697 A1 | 5/2011 | Power, III et al. | |

* cited by examiner

MODULAR HYDROKINETIC TURBINE

CROSS-REFERENCE TO RELATED APPLICATIONS

This application claims priority to U.S. Provisional Application No. 62/172,563, filed on Jun. 8, 2015. The disclosure of the prior application is considered part of and is incorporated by reference in the disclosure of this application.

BACKGROUND OF THE INVENTION

The present invention generally relates to hydropower systems, and more specifically to a modular hydrokinetic turbine.

In general, prior hydropower systems are disruptive to ecosystems, the environment, require high capital expenditure and result in extended permitting time to acquire regulatory approvals. The ensuing studies, engineering and time for construction approvals, raise the overall costs associated with hydro power development to the extent that the resulting Levelized Cost of Energy (LCOE) to recuperate these expenses becomes a risky proposition, as a developer must consider the possibility that a project may not be approved.

In developing countries, particularly in rural isolated communities, mobilization and the logistics involved in accessing the equipment necessary to develop traditional hydro power may also be an issue. High cost transmission lines required to service such isolated markets from large scale power projects frequently is not viable and so the optimal solution would be to create micro-grid scale power that can be easily and quickly deployed close to its end users with minimal infrastructure requirements.

Existing hydro solutions are also limited to the width of the waterway as they disrupt the flow of water downstream due to the nature of their design and once constructed are difficult to scale without substantial disruption and investment.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention generally relates to hydropower systems, and more specifically to a modular hydrokinetic turbine.

In an aspect, the invention features an apparatus including a pre-fabricated, floating, scalable, modular hydrokinetic turbine comprising vertically oriented blades in power optimized arrays.

In another aspect, the invention features an apparatus including modular vertically floating units tethered to shore with a generator residing above a waterway and a plurality of vertically oriented blades submerged in the waterway to convert a latent kinetic energy of a moving waterway into electricity.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following FIGs., wherein.

DETAILED DESCRIPTION

Figure 1:
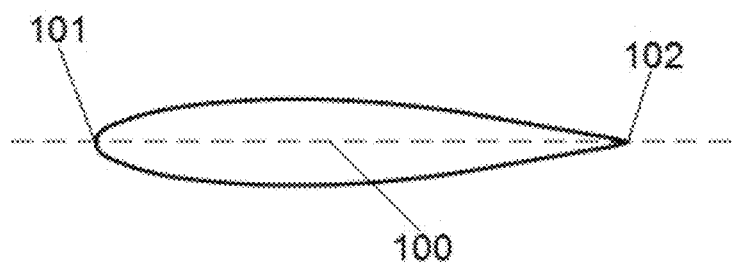
FIG. 1 is a diagram of a side view of the width of the symmetrical vertical blade of the type used for this invention in a hydro environment.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In the description below, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Hydrokinetic energy is the energy that can be captured from flowing water that occurs in rivers or ocean currents. This includes ocean wave energy, tidal energy, river in-stream energy, and ocean current energy. Hydrokinetic technologies produce renewable electricity by harnessing the kinetic energy of a body of water, the energy that results from its motion. The concept of this invention is a zero-head technology that converts the latent kinetic energy of a moving waterway into electricity. No diversions, no impoundments, just free-flowing water power used to generate consumable energy. Modular vertically floating units are tethered to shore with the generator residing above water and vertically oriented blades submerged in water. They are scalable by being arranged in arrays both across the waterway & downstream, depending on the site conditions. The estimated head width range is 6-100 feet and due to the flow dynamics around vertically oriented blades, they do not block the flow of water, and thus do not impede fish migration. It is suited for rural electrification, captive generation, grid tie in and produced with electrical applications in mind & ready to feed electricity upon being installed.

Preferred operating parameters of the present invention include moving water between 3 to 6 mph, capable of operating in shallow or narrow waterways that can be scalable up to 1 MWh. One objective is to gain efficiency downstream, and further improve output. The vertical orientation of the blades actually increase the speed of the water flow as it moves around the vertical turbines rotation and moves downstream.

The preferred installation infrastructure requirements are land based with minimal in water work that can be installed in a matter of weeks as opposed to years (as is the case with conventional hydropower technology). As a result, they can be easily maintained, repaired or removed, while being profitable at $0.08-$0.12 per kWh. Transmission costs are greatly reduced as the power can be generated closer to the end users.

An example short term application is for military or FEMA type deployment. An example long term application is a Micro-grid solution where the configuration can be quickly and easily scaled up or down as demand deems necessary simply by attaching more generator modules downstream.

In general, there are three common cost challenges to renewable solutions:
1. High storage costs
2. High costs of infrastructure, civil engineering, & development
3. High cost of land The innovative nature of our hydro solution is that in relatively stable water flow environments (e.g., rivers, irrigation canals, and so forth) the volume may fluctuate, but the speed of the water is relatively constant, flows 24 hours and thus eliminates the need for power storage. Add the advantages of a low cost, reliable, fast deploying technology, requiring little/no civil work and the result is a disruptively low turnkey cost for generating power and lowest Levelized Cost of Energy (LCOE) among renewables.

This present invention is transformational on multiple fronts. The low cost of the turnkey system is disruptive, unlike traditional hydro solutions it requires neither head nor a wide waterway. Furthermore it exploits the length of the waterway, allowing it to scale far more easily and can thus operate in an environment as small as irrigation canals.

For example, recent studies have shown that the power of the wind actually increases as air flows through a tightly arranged vertical wind turbine configuration that is set up in a particular pattern. This is a critical conclusion as we should see similar results when a similar configuration is used in moving water. Our opinion is that because the direction of the wind in an open environment is more volatile to changes in both speed and direction than in a hydro environment, that we should be able to generate even better results because the flow and direction of the water flow is consistent.

What is unique is the floating platform of the present invention for generating power, the minimal infrastructural needs and the proven scientific theories behind the modular configuration. Despite the recent drop in the cost of solar installations, the impact of our innovations is that in a micro-grid installation, we could create four times the power at half the cost of solar. The cost spread is even larger when battery storage, which is a necessity for a 24 hour solution, is added to the equation. The bottom line is that a 5 kW solar system with storage, with a typical 15% efficiency rate can cost $2.00-$3.00 per watt installed, versus $1.50 for our mini hydro solution of the present invention. Depending upon the water speed at an installation site, data shows that one can expect 60%-90% efficiency or 400% more power than an equivalent rated solar system. One other key advantage is that we can modify the generators to have different operating parameters to match faster or slower moving bodies of water. It is possible to modify our system to match a wide band of water flow speeds and water depths by adjusting the width and heights of the blades.

Systems according to the present disclosure require no dam or head as it converts the latent kinetic energy of a moving waterway into electricity. The floating modules require little civil construction, which minimizes the need for heavy equipment, and dramatically accelerates the development and installation time; all while producing little environmental impact at a fraction of the installed cost of conventional hydropower. It is versatile enough for quick deployment, if necessary in as little as a few days for both short and long term applications with minimal physical infrastructure. This configuration can be quickly and easily scaled up or down as necessary simply by attaching more generator modules downstream.

As the generators are located above the water line, it can be easily maintained or replaced without shutting down the entire array. It can easily be removed in part or in whole and leave no footprint behind because no new dams were constructed and no changes were made that would impact the aquatic habitat. The array will have the versatility to scale along the length and width of even narrow waterways such as irrigation canals, while traditional hydro is constrained by width.

FIG. 1 is a diagram of a side view of the width of the symmetrical vertical blade of the type used for this invention in a hydro environment. The width and length may vary, but the following parameters should preferably be consistent. Both sides of the chord 100 should be identical in dimensions, or symmetrical. The leading edge of the blade 101 should be rounded and the trailing edge 102 can be pointed. A rounded trailing edge is also a possibility, but it must be of lesser width than the leading edge.

Figure 2:
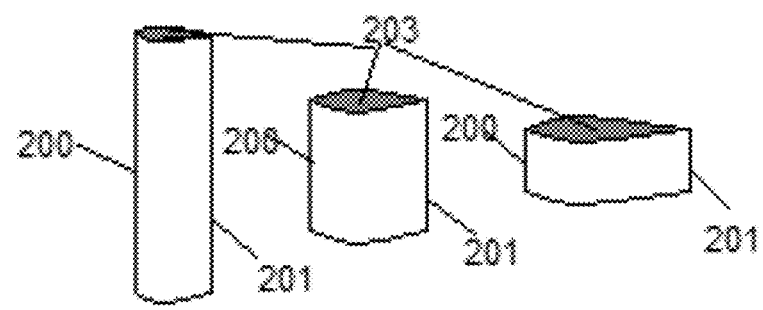
FIG. 2 is a diagram of various side views of the length of symmetrical vertical blades of the type used in this invention. These show various dimensions of the same blade which can be used in diverse hydro environments.

FIG. 2 is a diagram of various side views of the length of symmetrical vertical blades of the type used in this invention. These show various dimensions of the same blade which can be used in diverse hydro environments. A key factor in this application in terms of the blade shape is the surface area. The examples shown have a leading edge 200, a trailing edge 201 and all have a symmetrical shape 202 (albeit different lengths and widths). These blades can be made of metals or man-made materials and may be coated with chemicals or materials that reduce rust or long term deterioration from exposure to water or other liquids (e.g., in waste water plants).

Figure 3:
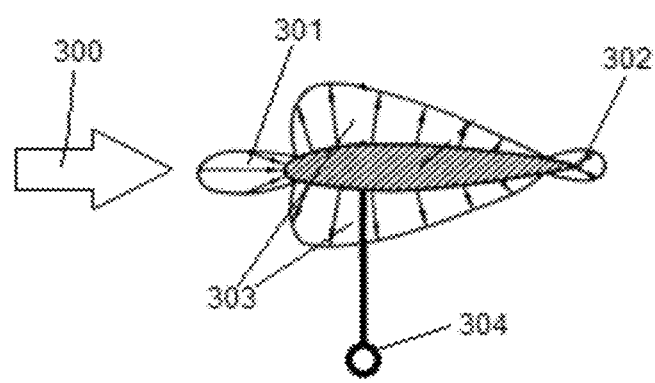
FIG. 3 is a diagram of a side view of the symmetrical vertical blade of the type of this invention illustrating the pressures on the blade as it rotates into the flow of water.

FIG. 3 is a diagram of a side view of the symmetrical vertical blade of the type of this invention illustrating the pressures on the blade as it rotates into the flow of water. 300 shows the direction of the flow of water towards the leading edge of the blade. The result is that that even low pressure points occur at the leading edge 301 and the trailing edge 302. Across the length of the blade, the pressure is evenly distributed 303 minimizing lift away from the center of rotation 304, which would affect rotation speed. A non-symmetrical blade shape would place more pressure on the structure of the cross support beams, reduce the speed and potentially experience regular stalling.

Figure 4:
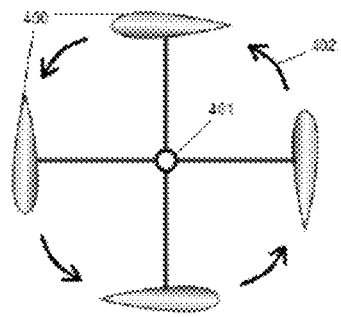
FIG. 4 is a diagram from above of a symmetrical vertical blade configuration with other vertical blades in an operational array as they rotate.

FIG. 4 is a diagram from above of a symmetrical vertical blade configuration with other vertical blades in an operational array as they rotate. This illustration shows 4 blades, but the array can also function with 2, 3, 4 or even more blades depending upon the diameter of the rotation. Here, the blades 400 rotate around the center 401, which is attached to the generator. The rotation direction show here 402 is counter clockwise, but may also be configured to rotate clockwise. This is important in FIG. 12, as it impacts the method of installing multiple of these modules in scale deployments.

Figure 5:
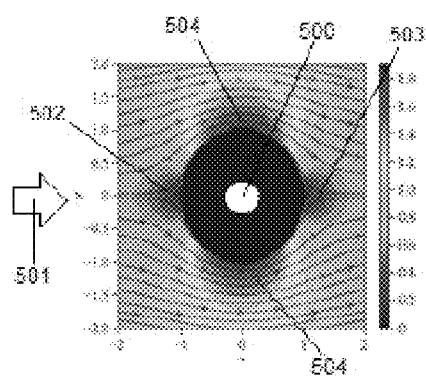
FIG. 5 is a computer generated diagram of an above view of a rotating array of vertical blades showing the flow of water around the area of rotation and its impact on pressure and speed of flow.

FIG. 5 is a diagram of an above view of a rotating array of vertical blades showing the flow of water around the area of rotation and its impact on pressure and speed of flow. The center of rotation 500 and the black area show the area of circulation of the blades. The speed of rotation and number of blades used creates a vortex around which the water will flow around 501. The result of this is that low pressure points occur along the leading edge 502 and the trailing edge 503 which then divert water smoothly across the remaining surface of the rotation and as a result accelerates 504.

Figure 6A:
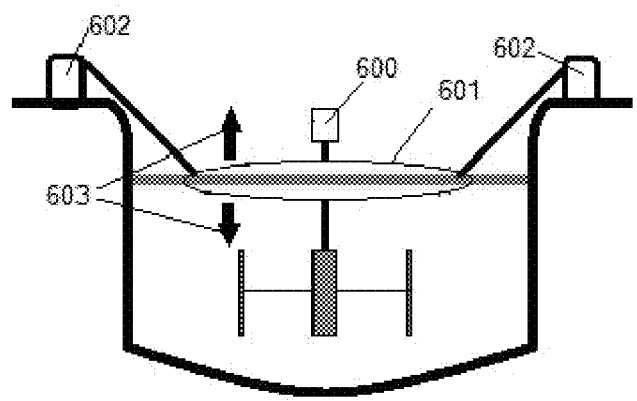
FIG. 6A is a diagram of a side view of symmetrical vertical blades in an operational array attached to the generator suspended on a floating device that is tethered to land or other secured anchoring point, referred to these as "Floating hydro-generator modules."

FIG. 6A is a diagram of a side view of symmetrical vertical blades in an operational array attached to the generator 600 suspended on a floating device 601 that is tethered to land or other secured anchoring point 602. We refer to these as "Floating hydro-generator modules." The tethering of the units can be accomplished using rope, cables or other natural or man-made materials that provide strength and resilience in a wet environment. The anchoring point can be to an existing structure or a man-made foundation can be built as a land anchor or other securing point for the module. The floating device which can be made of natural or man-made materials rises or lowers 603 unhindered with the change in water volume. Additional structural beams may be added to eliminate the possibility of the rotating blades hitting the bottom of the waterway in the event of unusually low volumes of water.

Figure 6B:
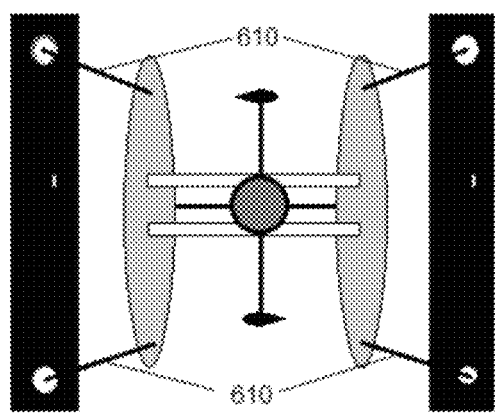
FIG. 6B is a diagram of an above view of a floating hydro-generator module tethered to a secured anchoring point.

FIG. 6B is a diagram of an above view of a floating hydro-generator module tethered to a secured anchoring point. Shows the floating hydro generator modules secured 610 at four point to the land based anchor points. Multiple locations of tethering may be employed including water based anchors in necessary.

Figure 7A:
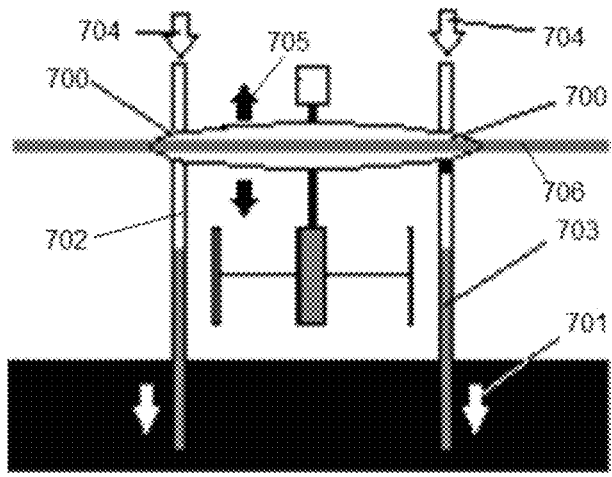
FIG. 7A is a diagram of a side view of a floating hydro generator module that can be anchored into the bed of the water channel.

FIG. 7A is a diagram of a side view of a floating hydro generator module that can be anchored into the bed of the water channel. Depending upon the waterway conditions and flow speed, the floating module 700 can be anchored into the bed of the waterway 701 using an extension to the main hollow structural pipe 702. This extension 703 can vary in length to meet the depth of the waterway and is inserted from above the water line 704 for easy installation. The floating hydro generator module can rise and lower 705 along with the water level using the anchor pipes as tracks to keep them in position. The system can have mechanisms in place to ensure that in the event of low water levels 706, the rotating blades will not hit the bottom of the waterway.

Figure 7B:
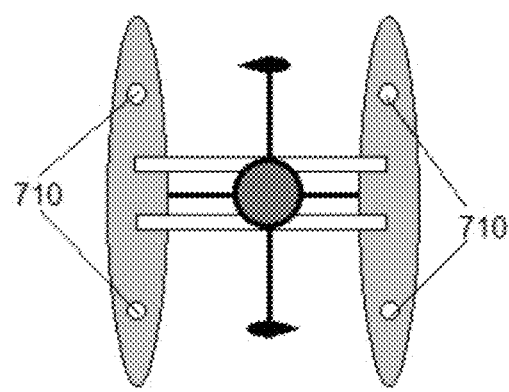
FIG. 7B is a diagram of an above view of the floating hydro generator module that can be anchored to the bed of the waterway.

FIG. 7B is a diagram of an above view of the floating hydro generator module that can be anchored to the bed of the waterway. The diagram shows the hollow areas 710 where the structural pipes are inserted to anchor the system in place. This can be used in conjunction with additional land and or water based anchors.

Figure 8A:
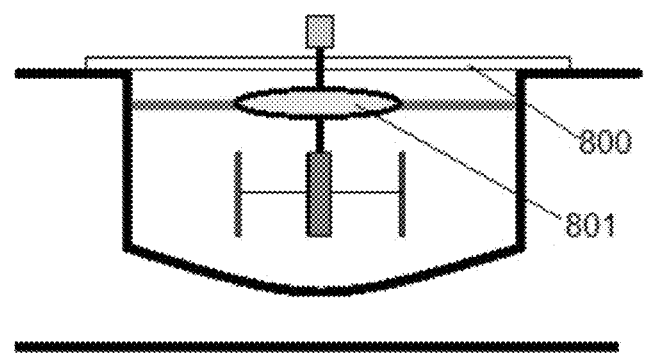
FIG. 8A is a diagram of a side view of symmetrical vertical blades in an operational array which is attached directly to land or other secured anchoring point using structural support beams.

FIG. 8A is a diagram of a side view of symmetrical vertical blades in an operational array which is attached directly to land or other secured anchoring point using structural support beams. In this implementation, the blades and generator are supported and anchored by structural beams 800 stretching across the width of the waterway and anchored to a land based support. Additional floating devices 801 may be added in the event that the water level is highly variable, as well as protection in the event that the water level becomes too shallow for the rotating blades and prevent contact with the bottom of the waterway.

Figure 8B:
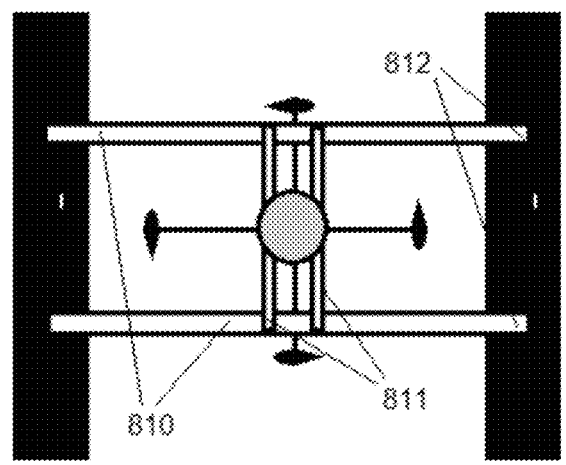
FIG. 8B is a diagram of an above view of symmetrical vertical blades in an operational array which is attached directly to land or other secured anchoring point using structural support beams.

FIG. 8B is a diagram of an above view of symmetrical vertical blades in an operational array which is attached directly to land or other secured anchoring point using structural support beams 810. The system can use two or multiple number of support beams and cross beams 811 to anchor the generator and rotating blades. The structural support beams may be attached to existing land based infrastructure or installed foundations 812.

Figure 9:
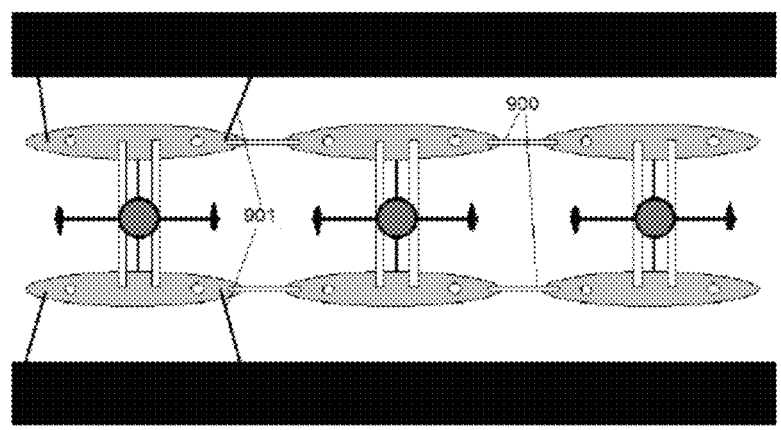
FIG. 9 is diagram of an above view of an array of floating hydro-generator modules attached vertically downstream.

FIG. 9 is diagram of an above view of an array of floating hydro-generator modules attached vertically downstream. The individual floating modules can be attached along the ends of the floating devices 900. The distance between the individual modules will vary by water conditions. The individual units as attached can be tethered 901 or anchored to land as described in previous figures.

Figure 10:
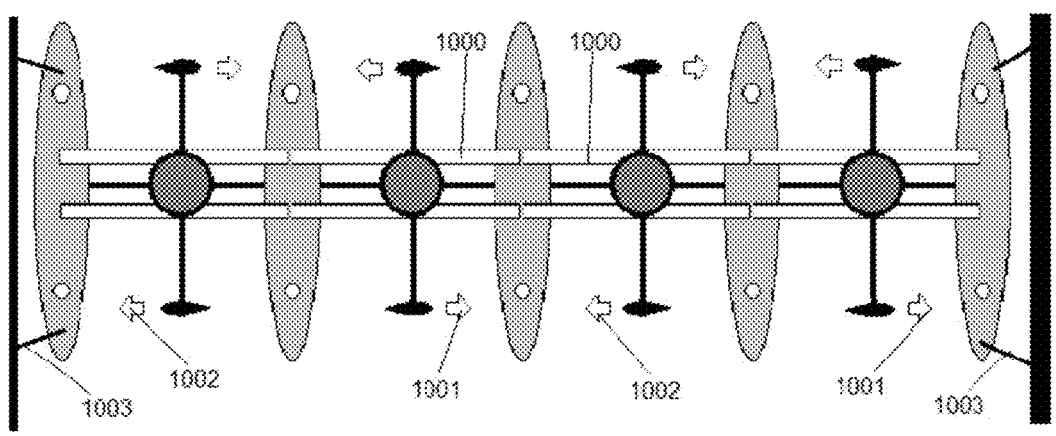
FIG. 10 is a diagram of an above view of an array of floating hydro-generator modules attached horizontally across a waterway

FIG. 10 is a diagram of an above view of an array of floating hydro-generator modules attached horizontally across a waterway In this iteration, it is possible to attach multiple modules along the length of the waterway while reducing the number of floats using horizontal support beams 1000. The units here are shown rotating clockwise 1001 and counterclockwise 1002. These may be tethered 1003 to land and or supported with anchors to the bottom of the waterway. FIG. 7A.

Figure 11:
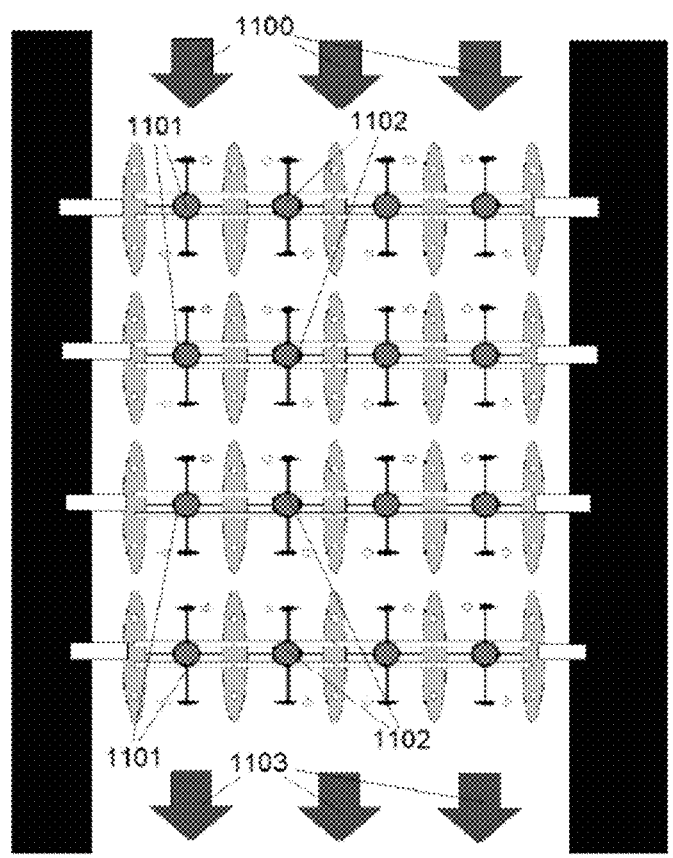
FIG. 11 is a diagram of an above view of an array of floating hydro generator modules attached in an array both vertically and horizontally in a scalable configuration.

FIG. 11 is a diagram of an above view of an array of floating hydro generator modules attached in an array both vertically and horizontally in a scalable configuration. This array can be arranged either by using floating hydro generator modules or non-floating hydro generator modules in environments where existing canal infrastructure permits. 1100 shows the flow direction of the waterway. Note the clockwise rotation 1101 of the modules as they go downstream which are paired with counterclockwise rotation 1102. This accelerates the water flow speed while increasing the power as its exits 1103 the array.

Figure 12:
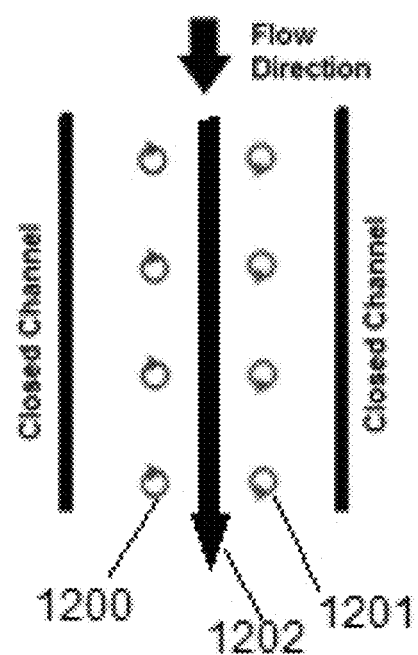
FIG. 12. is an illustration showing the rotation direction of the individual floating hydro-generator modules in a downstream vertically oriented array to maximize the power of the water flow.

FIG. 12 is an illustration showing the rotation direction of the individual floating hydro-generator modules in a downstream vertically oriented array in pairs of two to maximize the power of the water flow. The units rotating clockwise 1200 are placed across from units rotating counterclockwise 1201 in series of 2 where possible to increase power as the water flows to the downstream units 1203. This effect of not only avoiding power loss, but increasing its power can only be achieved using vertically oriented blades. The layout of the individual lines of modules may also be offset so that the generators are not directly horizontal to each other.

Embodiments of the present invention may have one or more of the following advantages.

The generators used for the modular systems of the present invention can be universally designed for multiple capacities upwards of 20 kw or more each. The individual modules generators can be replaced without shutting down the entire grid.

The generators are above water and can be easily maintained The individual modules can be attached to form arrays of up to one (1) MW or more depending upon the site. The present system can be increased or reduced in capacity quickly.

The configuration of the array increases the power of the water flow downstream instead of reducing it and therefore be scaled downstream, where others cannot.

The present invention operates in water speeds as low as three (3) mph.

The floating hydro generator module enables the system to adjust to changes in water levels and provides a safe mechanism to protect the rotating blades from colliding with the bottom of the water way in the event of extreme low water levels.

The present invention can be installed with or without the floating mechanism.

The present invention includes an array that does not require the construction of a head.

The present invention can be installed and operational in as little as a few hours if anchored onshore.

The present invention is a portable system that does not require heavy equipment to install Due to the flow characteristics of vertically rotating blades, there will be little if any environmental impact on aquatic creatures. Small debris will flow around the naturally protected rotating area due to the low pressure areas created which diverts water away from its leading edge.

The present invention can be considered a temporary structure in its floating configuration, changing the regulatory approval status.

The low cost of infrastructure, soft costs and installation speed of the present system ensures the lowest turnkey cost and efficiency in the renewable category.

The present invention operates in waterways of less than 6 feet in width.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. An apparatus comprising:
a pre-fabricated, floating, scalable, modular hydrokinetic vertical axis cross-flow turbine comprising floating devices and vertically oriented blades in power optimized arrays comprising counter-rotating pairs.
2. The apparatus of claim 1 further comprising a tether.
3. The apparatus of claim 2 wherein the tether links to a shore of a waterway.
4. The apparatus of claim 3 wherein the shore includes a generator residing above the waterway.
5. The apparatus of claim 1 wherein the blades are manufactured from a group consisting of a synthetic polymer, a durable synthetic compound, and a metal.

* * * * *